US012375296B2

(12) United States Patent
Sahoo et al.

(10) Patent No.: US 12,375,296 B2
(45) Date of Patent: Jul. 29, 2025

(54) OBTAINING A DOMAIN CERTIFICATE UTILIZING A PROXY SERVER

(71) Applicant: Oracle International Corporation, Redwood Shores, CA (US)

(72) Inventors: Sanjeeb Kumar Sahoo, Pleasanton, CA (US); Anthony Furious Long, Edmonds, WA (US); Benjamin Charles Gay, Snohomish, WA (US); Mina Anes, Bothell, WA (US); Shane Burgess, Concord, NH (US)

(73) Assignee: Oracle International Corporation, Redwood Shores, CA (US)

( * ) Notice: Subject to any disclaimer, the term of this patent is extended or adjusted under 35 U.S.C. 154(b) by 185 days.

(21) Appl. No.: 17/974,420

(22) Filed: Oct. 26, 2022

(65) Prior Publication Data
US 2024/0146543 A1  May 2, 2024

(51) Int. Cl.
*H04L 9/32* (2006.01)
(52) U.S. Cl.
CPC .......... *H04L 9/3263* (2013.01); *H04L 9/3271* (2013.01)
(58) Field of Classification Search
CPC ... H04L 9/3263; H04L 9/3271; H04L 9/0894; H04L 9/3268
See application file for complete search history.

(56) References Cited

U.S. PATENT DOCUMENTS

| 8,327,128 | B1* | 12/2012 | Prince | H04L 63/0884 |
| | | | | 713/153 |
| 8,447,984 | B1* | 5/2013 | Siegel | H04L 9/3268 |
| | | | | 713/173 |
| 2022/0182246 | A1* | 6/2022 | Murphy | H04L 9/3268 |

* cited by examiner

Primary Examiner — El Hadji M Sall
(74) Attorney, Agent, or Firm — Kilpatrick Townsend & Stockton LLP

(57) ABSTRACT

According to certain implementations, a certificate management service of a cloud service provider requests a certificate for a domain from a certificate authority utilizing an HTTP-based challenge. The certificate authority responds with a challenge string and a subdirectory within the domain. The challenge string and subdirectory within the domain are sent from the certificate management service to a proxy server of the cloud service provider that manages a flow of data to a host that hosts the domain. When the certificate authority sends a request to the sub directory within the domain, the request is intercepted at the proxy server. Instead of forwarding the request to the host that hosts the domain, the proxy server responds to the certificate authority with the challenge string. This verifies ownership of the domain, which is required to obtain the certificate for the domain.

20 Claims, 16 Drawing Sheets

OBTAINING A DOMAIN CERTIFICATE UTILIZING A PROXY SERVER

BACKGROUND

Domains (also known as domain names) are commonly used to identify network resources. For example, domains are used to reference web sites, email services, file sharing services, etc. Web browsers and other entities that access these domains rely on certificate authorities to issue a certificate for such domains that identifies and validates the domains for use. These certificate authorities confirm that a requestor has control over a domain before issuing a certificate for the domain.

One way that certificate authorities confirm control over a domain is via a hypertext transfer protocol (HTTP)-based challenge. HTTP-based challenges are time-consuming to perform for domain owners, and there is currently no way to perform HTTP-based challenges in a situation where the domain is hosted and/or managed by a cloud service provider infrastructure.

BRIEF SUMMARY

The present disclosure relates generally to domain certificate challenges. More particularly, novel techniques are described for automatically responding to HTTP-based domain certificate challenges utilizing a proxy server. Various embodiments are described herein to illustrate various features. These embodiments include various methods, systems, non-transitory computer-readable storage media storing programs, code, or instructions executable by one or more processors, and the like.

According to certain implementations, a certificate management service of a cloud service provider requests a certificate for a domain from a certificate authority utilizing an HTTP-based challenge. The certificate authority responds with a challenge string and a subdirectory within the domain. The challenge string and sub directory within the domain are sent from the certificate management service to a proxy server of the cloud service provider that manages a flow of data to a host that hosts the domain. When the certificate authority sends a request to the sub directory within the domain, the request is intercepted at the proxy server. Instead of forwarding the request to the host that hosts the domain, the proxy server responds to the certificate authority with the challenge string. This verifies ownership of the domain, which is required to obtain the certificate for the domain.

At least one embodiment is directed to a computer-implemented method. The method can include receiving, by a computer system at a proxy server that manages a flow of data to a plurality of hosts, a request from a certificate authority identifying a first domain hosted by one of the plurality of hosts; determining, by the computer system at the proxy server, a response to the request; and sending, by the computer system at the proxy server, the response to the certificate authority.

Another embodiment is directed to a system comprising one or more processors and instructions that, when executed by the one or more processors, cause the computing device to perform any suitable combination of the method(s) disclosed herein.

Still another embodiment is directed to a non-transitory computer-readable medium storing computer-executable instructions that, when executed by one or more processors of a computing cluster, cause the computing cluster to perform any suitable combination of the method(s) disclosed herein.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In order for public certificate authorities (CAs) to issue a certificate identifying a domain, the CA must first verify that the requestor has "control" over the domain. Two methods for proving domain control include a first (DNS-based challenge) method adding a text record to the domain naming system (DNS) so when the public CA queries the DNS it will see the challenge string and know that the requestor has control over the domain. A second (HTTP-based challenge) method is to put a challenge string in a specific file serviced by the web server that hosts the domain. Both of these solutions require the updating of these challenge strings for each renewal.

Currently, customers of a cloud service provider need to manually perform certificate retrieval/renewal for all domains that are hosted and/or managed by the cloud service provider. If the customer does not update the certificate after expiration, a service outage may occur due to an expired domain certificate.

To address this issue, a certificate management service of a cloud service provider requests a certificate fora domain from a certificate authority utilizing an HTTP-based challenge. The certificate authority responds with a challenge string and a subdirectory within the domain. The challenge string and subdirectory within the domain are sent from the certificate management service to a proxy server of the cloud service provider that manages a flow of data to a host that hosts the domain. Instructions are also sent to the proxy server to respond to a request directed to the sub directory within the domain with the challenge string.

The proxy server confirms receipt of the instructions and challenge string with the certificate management service, and the certificate management service notifies the certificate authority. In response, the certificate authority sends a request (e.g., a request for the challenge string) to the sub directory within the domain. This request is intercepted at the proxy server, and instead of forwarding the request to the host that hosts the domain, the proxy server responds to the certificate authority with the challenge string. The certificate authority confirms the challenge string and sends the certificate for the domain to the requestor (the certificate management service).

Figure 1:
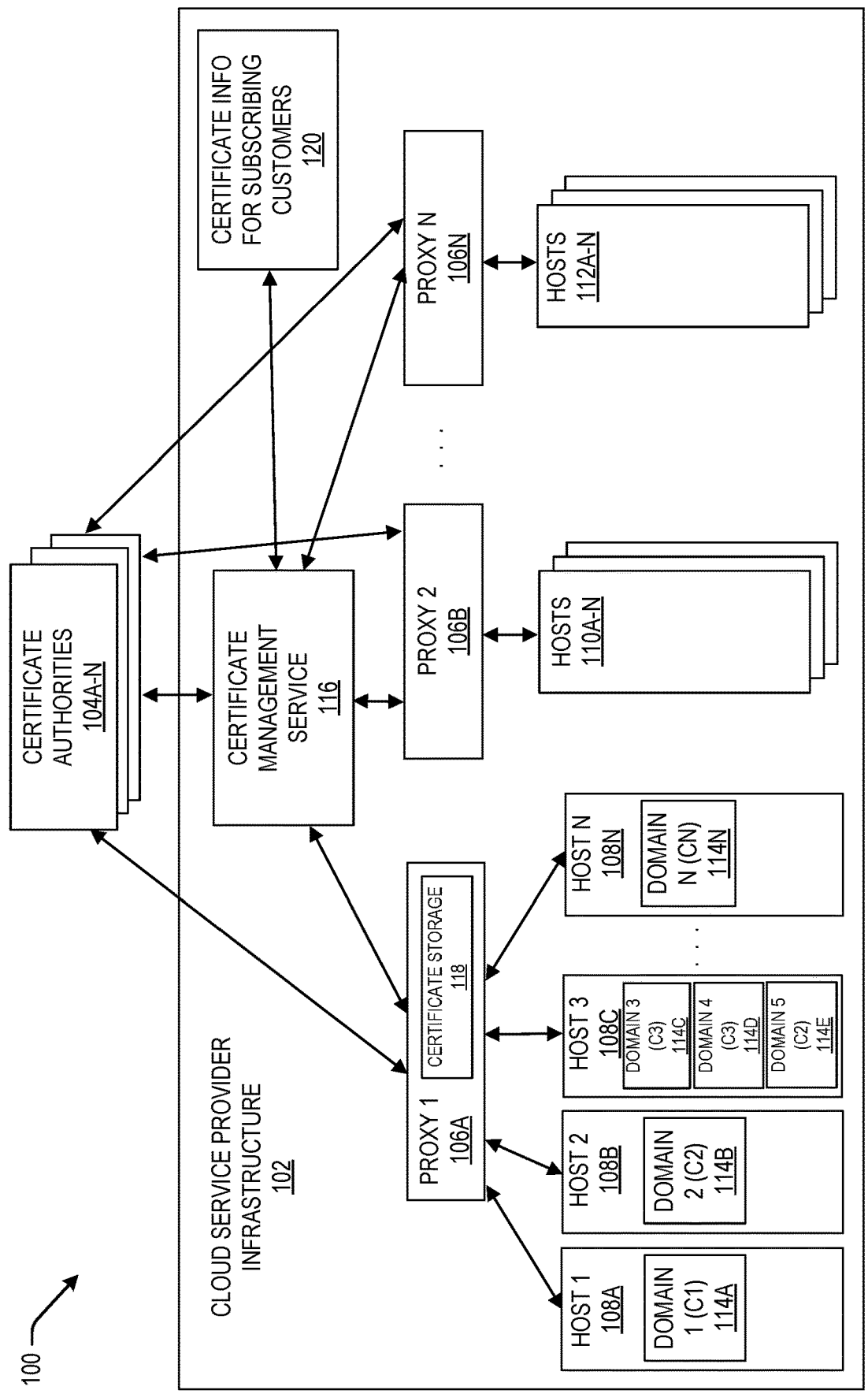
FIG. 1 is a block diagram of an exemplary HTTP-based certificate procurement environment, according to at least one embodiment.

FIG. 1 illustrates an exemplary HTTP-based certificate procurement environment 100, according to one exemplary embodiment. As shown, a cloud service provider infrastructure 102 is in communication with a plurality of certificate authorities 104A-N. In various embodiments, the cloud service provider infrastructure 102 may include a cloud-based system that provides resources such as storage, compute, and networking.

Additionally, the cloud service provider infrastructure 102 includes a proxy servers 106A-N. The proxy servers 106A-N may each include a load balancer that manages a flow of data to a plurality of respective hosts 108-112A-N that are implemented within the cloud service provider infrastructure 102. However, the proxy servers 106A-N may each include any system that receives requests intended for the hosts 108-112A-N and routes the requests to the hosts 108-112A-N. For example, the proxy servers 106A-N may each include an application programming interface (API) gateway, a content delivery network (CDN), etc.

In one example, a first proxy server 106A may manage a flow of data to a plurality of hosts 108A-N. Each of these hosts 108A-N may host one or more domains 114A-N. These domains may be hosted by the hosts 108A-N on behalf of one or more customers (C1-CN as shown). For example, the hosts 108A-N may be associated with one or more tenancies within the cloud service provider infrastructure 102. The customers may have a corresponding tenancy that includes domain hosting by one or more of the hosts 108A-N. It should be noted that a single host 108A-N may host multiple different domains on behalf of multiple different customers.

For example, a first one of the customers (C1) may request that the cloud service provider infrastructure 102 host a first domain 114A (such as www.domain.com). In response, the cloud service provider infrastructure 102 may allocate space within a first hosting node 108A, and the first hosting node 108A may host the first domain 114A as well as any resources identified and accessed utilizing the first domain 114A within the allocated space. When a request (e.g., from a web browser of a computing device) is received at the cloud service provider infrastructure 102 that includes the first domain 114A (e.g., within a uniform resource locator (URL)), the first proxy server 106A (acting as a load balancer) may identify the first domain 114A within the URL and may route the request to the first hosting node 108A.

Further, in various embodiments, the first customer system (C1) may request that a certificate (such as a public key certificate or private key certificate) be obtained for the first domain 114A. The request may also indicate that the certificate be obtained utilizing a hypertext transfer protocol (HTTP)-based challenge. In one example, the request may also indicate a first certificate authority 104A to provide the certificate. For instance, the certificate authorities 104A-N may each include a public certificate authority, a private certificate authority, etc.

Further still, in various embodiments, the certificate request received from the first customer system may be managed by a certificate management service 116. For example, in response to receiving the certificate request, the certificate management service 116 may send a request for a certificate for the first domain 114A to a first one of the certificate authorities 104A. The first certificate authority 104A may reply with a response that includes a challenge string and a subdirectory within the first domain 114A. For example, the challenge string may include a string of characters having a predetermined length, and the subdirectory may be indicated utilizing a URL.

Also, in various embodiments, in response to receiving the response from the first certificate authority 104A, the certificate management service 116 may send instructions to the first proxy server 106A. These instructions may direct the first proxy server 106A to store the challenge string locally within the first proxy server 106A, and to automatically respond to a request directed to the subdirectory within the first domain 114A with the challenge string instead of routing the request to the first hosting node 108A.

Alternately, in various embodiments, in response to receiving the response from the first certificate authority 104A, the certificate management service 116 may store the challenge string locally or at a predetermined storage location. The certificate management service 116 may then send instructions to the first proxy server 106A that direct the first proxy server 106A to automatically forward a request directed to the subdirectory within the first domain 114A to the certificate management service 116 or request the challenge string from the certificate management service 116, instead of routing the request to the first hosting node 108A.

In addition, in various embodiments, in response to receiving the instructions, the first proxy server 106A may send a confirmation to the certificate management service 116 indicating that the instructions were received at the first proxy server 106A and will be implemented by the first proxy server 106A. In response to receiving this confirmation, the certificate management service 116 may send instructions to the first certificate authority 104A to request the challenge string from the sub directory within the first domain 114A.

Furthermore, in various embodiments, in response to receiving the instructions from the certificate management service 116, the first certificate authority 104A may send a request to the subdirectory within the first domain 114A. This request may be received by the first proxy server 106A. Instead of routing the request to the first hosting node 108A, the first proxy server 106A may automatically respond to the request and may send the challenge string to the first certificate authority 104A.

Alternately, instead of routing the request to the first hosting node 108A, the first proxy server 106A may forward the request to the certificate management service 116, where the certificate management service 116 may retrieve and send the challenge string to the first certificate authority 104A. In another example, instead of routing the request to the first hosting node 108A, the first proxy server 106A may automatically request the challenge string from the certificate management service 116 and may respond to the request by sending the retrieved challenge string to the first certificate authority 104A.

Further still, in response to receiving the challenge string, the first certificate authority 104A may verify the response and may send the requested certificate for the first domain 114A to the certificate management service 116. The certificate management service 116 may store the certificate locally in certificate storage 120 and/or send the certificate to the first hosting node 108A for storage at certificate storage 118 of the first hosting node 108A in association with the first domain 114A. A confirmation message may also be sent from the certificate management service 116 to the first customer system.

Also, the certificate management service 116 may monitor an expiration date of the certificate, and when the certificate expires (or is within a predetermined time threshold from expiration), the certificate management service 116 may request an updated certificate from the first certificate authority 104A (or another certificate authority 104B-N), utilizing the same process illustrated above. This request may be performed automatically, or in response to obtaining permission from the first customer system.

In this way, the certificate management service 116 may automatically manage certificate procurement and updating for all domains that are managed by the cloud service provider infrastructure 102. The first proxy server 106A may automatically respond to requests (with challenge strings) for multiple different domains hosted by the hosts 108-112A-N.

Figure 2:
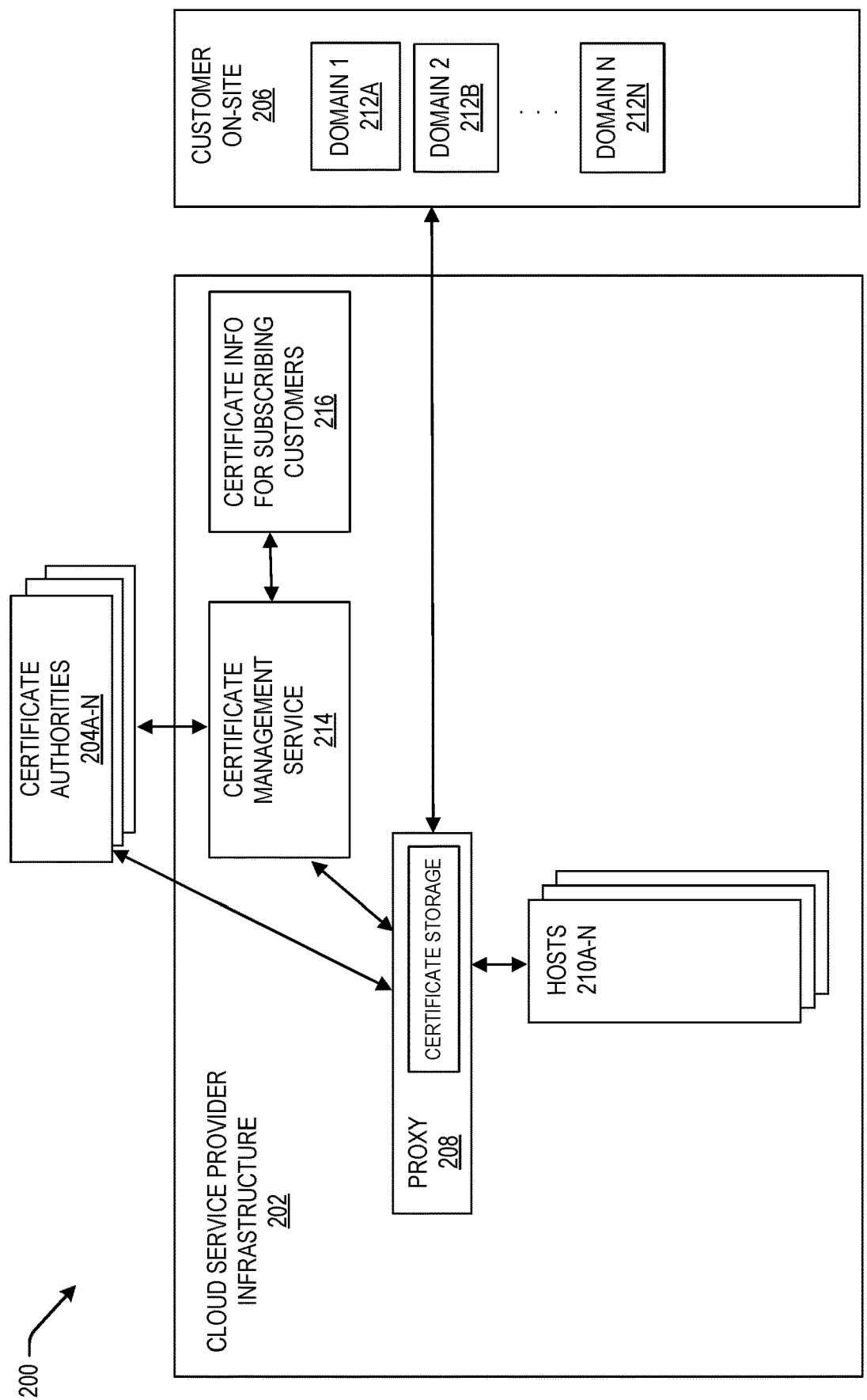
FIG. 2 is a block diagram of an exemplary HTTP-based certificate procurement environment with customer on-site domain hosting, according to at least one embodiment.

FIG. 2 illustrates an exemplary HTTP-based certificate procurement environment 200 with customer on-site domain hosting, according to one exemplary embodiment. As shown, a cloud service provider infrastructure 202 is in communication with a plurality of certificate authorities 204A-N and a customer on-site hosting infrastructure 206.

Additionally, the cloud service provider infrastructure 202 includes a proxy server 208. The proxy server 208 may include a load balancer, an application programming interface (API) gateway, a content delivery network (CDN), etc. For example, the proxy server 208 may manage a flow of data to domains hosted by a plurality of hosts 210A-N implemented within the cloud service provider infrastructure 202, as well as domains 212A-N hosted by the customer on-site hosting infrastructure 206.

For example, the customer on-site hosting infrastructure 206 may host a plurality of domains 212A-N. The customer on-site hosting infrastructure 206 may also request that the cloud service provider infrastructure 202 manage traffic directed to the plurality of domains 212-N. In response, the cloud service provider infrastructure 202 may direct the proxy server 208 to route traffic directed to the plurality of domains 212A-N. When a request (e.g., from a web browser of a computing device) is received at the cloud service provider infrastructure 202 that includes a uniform resource locator (URL) having one of the plurality of domains 212A-N, the proxy server 208 may identify the domain 212A-N within the URL and may route the request to the customer on-site hosting infrastructure 206.

Further, in various embodiments, the customer on-site hosting infrastructure 206 may request that a certificate (such as a public key certificate or private key certificate) be obtained for a first domain 212A. The request may also indicate that the certificate be obtained utilizing a hypertext transfer protocol (HTTP)-based challenge. In one example, the request may also indicate a first certificate authority 204A to provide the certificate. For instance, the certificate authorities 204A-N may each include a public certificate authority, a private certificate authority, etc.

Further still, in various embodiments, the certificate request received from the customer on-site hosting infrastructure 206 may be managed by a certificate management service 240. For example, in response to receiving the certificate request, the certificate management service 240 may send a request for a certificate for the first domain 212A to a first certificate authority 204A. The first certificate authority 204A may reply with a response that includes a challenge string and a sub directory within the first domain 212A. For example, the challenge string may include a string of characters having a predetermined length, and the sub directory may be indicated utilizing a URL.

Also, in various embodiments, in response to receiving the response from the first certificate authority 204A, the certificate management service 214 may send instructions to the proxy server 208. These instructions may direct the proxy server 208 to store the challenge string locally within the proxy server 208, and to automatically respond to a request directed to the sub directory within the first domain 212A with the challenge string instead of routing the request to the customer on-site hosting infrastructure 206.

Alternately, in various embodiments, in response to receiving the response from the first certificate authority 204A, the certificate management service 214 may store the challenge string locally or at a predetermined storage location. The certificate management service 214 may then send instructions to the proxy server 208 that direct the first proxy server 208 to automatically forward a request directed to the sub directory within the first domain 212A to the certificate management service 214 or request the challenge string from the certificate management service 214, instead of routing the request to the customer on-site hosting infrastructure 206.

In addition, in various embodiments, in response to receiving the instructions, the proxy server 208 may send a confirmation to the certificate management service 214 indicating that the instructions were received at the proxy server 208 and will be implemented by the first proxy server 208. In response to receiving this confirmation, the certificate management service 214 may send instructions to the first certificate authority 204A to request the challenge string from the sub directory within the first domain 212A.

Furthermore, in various embodiments, in response to receiving the instructions from the certificate management service 214, the first certificate authority 104A may send a request to the subdirectory within the first domain 212A. This request may be received by the proxy server 208. Instead of routing the request to the customer on-site hosting infrastructure 206, the proxy server 208 may automatically respond to the request and may send the challenge string to the first certificate authority 204A.

Alternately, instead of routing the request to the customer on-site hosting infrastructure 206, the proxy server 208 may forward the request to the certificate management service 214, where the certificate management service 214 may retrieve and send the challenge string to the first certificate authority 204A. In another example, instead of routing the request to the customer on-site hosting infrastructure 206, the proxy server 208 may automatically request the challenge string from the certificate management service 214 and may respond to the request by sending the retrieved challenge string to the first certificate authority 204A.

Further still, in response to receiving the challenge string, the first certificate authority 204A may verify the response and may send the requested certificate for the first domain 212A to the certificate management service 214. The certificate management service 214 may store the certificate locally in certificate storage 216 and/or send the certificate to the customer on-site hosting infrastructure 206 for on-site storage in association with the first domain 212A. A confirmation message may also be sent from the certificate management service 214 to the customer on-site hosting infrastructure 206.

Also, the certificate management service 214 may monitor an expiration date of the certificate, and when the certificate expires (or is within a predetermined time threshold from expiration), the certificate management service 214 may request an updated certificate from the first certificate authority 104A (or another certificate authority 104B-N), utilizing the same process illustrated above. This request may be performed automatically, or in response to obtaining permission from the first customer system.

In this way, the certificate management service 214 may automatically manage certificate procurement and updating for domains that are hosted outside of the cloud provider infrastructure 202.

Figure 3:
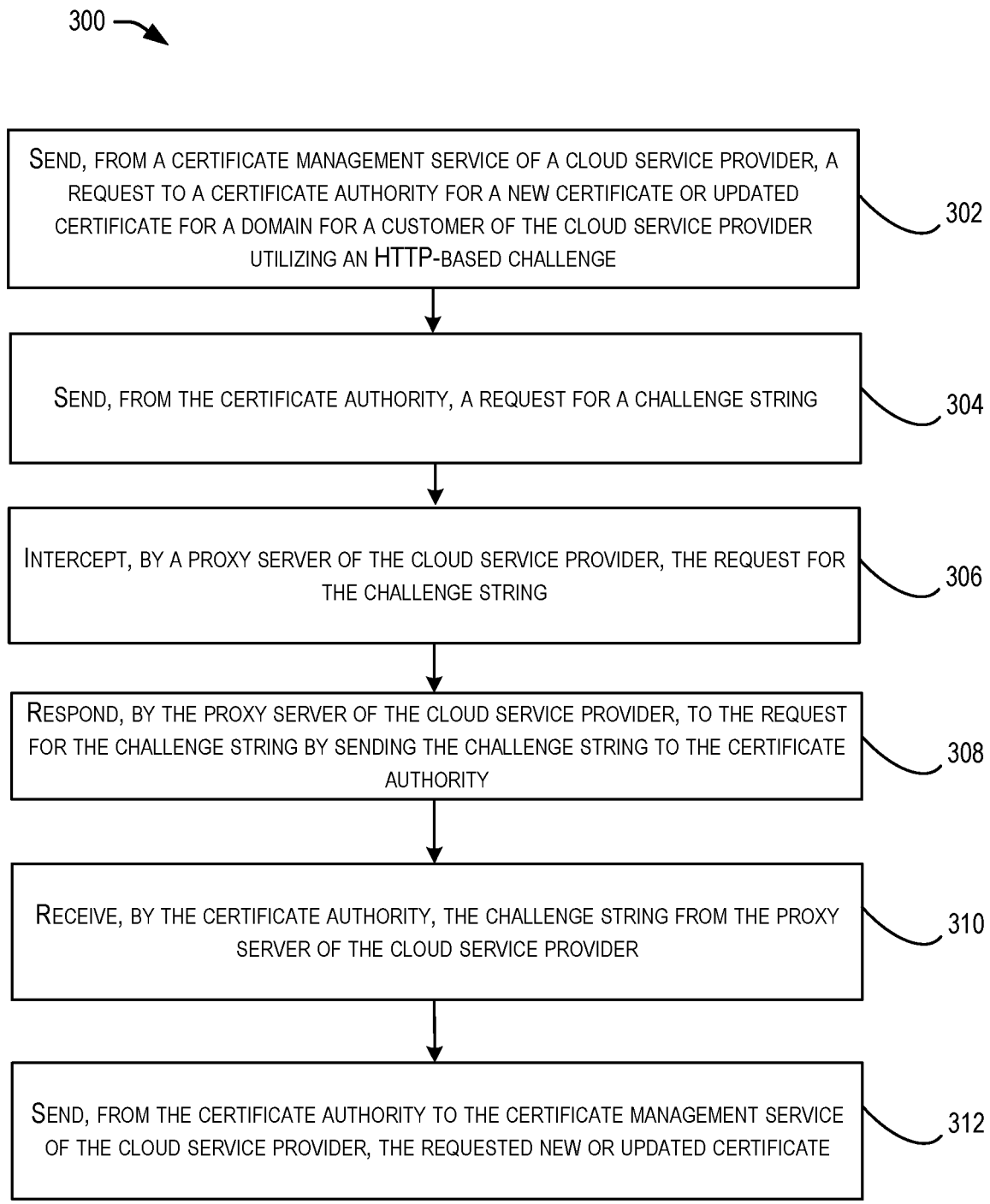
FIG. 3 illustrates an example method for obtaining a domain certificate utilizing a proxy server, according to at least one embodiment.

FIG. 3 illustrates an example method 300 for obtaining a domain certificate utilizing a proxy server, according to at least one embodiment. The method 300 may be performed by one or more components of FIGS. 1-2 and 10-11. A computer-readable storage medium comprising computer-readable instructions that, upon execution by one or more processors of a computing device, cause the computing device to perform the method 300. The method 300 may performed in any suitable order. It should be appreciated that the method 300 may include a greater number or a lesser number of steps than that depicted in FIG. 3.

The method 300 may begin at 302, where a request is sent to a certificate authority from a certificate management service of a cloud service provider for a new certificate or updated certificate for a domain for a customer of the cloud service provider utilizing an HTTP-based challenge. In various embodiments, the certificate may include a public key certificate that is requested from a public certificate authority. Additionally, in various embodiments, the certificate may include a private key certificate that is requested from a private certificate authority.

Further still, in various embodiments, the request may be sent in response to a request received from a customer (e.g., the owner of the domain) for the certificate. For example, the request received from the customer may include an identifier of a proxy server (such as a load balancer) that manages requests to the domain within the cloud service provider. In another example, the request may also indicate a type of challenge to be implemented (e.g., the HTTP-based challenge, etc.).

Also, in various embodiments, the request may include a request for an updated certificate for the domain from the certificate authority. For example, the request may be sent in response to the expiration of a certificate for the domain. In addition, in various embodiments, the cloud service provider may include a cloud-based system that provides resources such as storage, compute, and networking. For example, the cloud service provider may provide services such as infrastructure as a service (IaaS), software as a service (SaaS), etc.

Furthermore, in various embodiments, the cloud service provider may host the domain, as well as resources (such as a web page) that are identified and accessed utilizing the domain. For example, the cloud service provider may implement one or more computing nodes that host the resources. In another example, the one or more computing nodes may receive requests directed to the domain, and may service those requests (e.g. by providing data in response to the requests).

Further still, in various embodiments, one or more on-premises servers separate from the cloud service provider (e.g., that are owned by a customer) may host the domain as well as resources (such as a web page) that are identified and accessed utilizing the domain. For example, the cloud service provider may manage traffic to these on-premises services (e.g., utilizing a proxy server such as a load balancer of the cloud service provider). Also, in various embodiments, the certificate management service of the cloud service provider may include a system within the cloud service provider that manages and obtains domain certificates from certificate authorities.

Additionally, at 304, the certificate authority sends a request for a challenge string. In various embodiments, the request for the challenge string may be sent in response to the receipt of instructions to implement such a request, where the instructions are received at the certificate authority from the certificate management service.

For example, in response to receiving the request in 302, the certificate authority may send a response to the certificate management service of the cloud service provider, the response including a challenge string and an indication of a sub directory within the domain. The certificate management service may manage this response in a variety of ways (see, for example, FIGS. 4-9) and may send instructions to the certificate authority that include instructions for the certificate authority to request the challenge string from the sub directory within the domain. The certificate authority may send the request to the sub directory within the domain in response to these instructions.

Further, at 306, the request for the challenge string is intercepted by a proxy server of the cloud service provider. In various embodiments, the proxy server may include a load balancer implemented within the cloud service provider. For example, the proxy server may receive requests directed to various domains and may forward the requests to corresponding nodes within the cloud service provider that host those domains.

Further still, in various embodiments, the proxy server may include any layer 7 proxy server located in front of a node hosting the domain, such as an application programming interface (API) gateway, a content delivery network (CDN), etc. Also, in various embodiments, the proxy server may be instructed to respond to the request with the challenge string instead of forwarding the request to the node servicing the domain.

Also, at 308, the proxy server responds to the request for the challenge string by sending the challenge string to the certificate authority. For example, the proxy server may send the challenge string to the certificate authority without routing the request to one or more nodes/servers within the cloud service provider that host the domain.

In addition, at 310, the certificate authority receives the challenge string from the proxy server of the cloud service provider. In various embodiments, the certificate authority may perform one or more validation operations on the challenge string to confirm that the challenge string is correct.

Furthermore, at 312, the certificate authority sends the requested new or updated certificate to the certificate management service. The certificate may be stored at the certificate management service. In various embodiments, the certificate management service may provide the certificate to the one or more nodes/servers hosting the domain. These nodes/servers may provide the certificate to a browser in response to a request from the browser for content from the domain. In another example, the browser may compare the certificate to a list of trusted certificate authorities to confirm that the certificate is valid (and to verify the domain as trusted).

In this way, the cloud service provider may authentically manage the procurement and renewal of domain certificates. This may avoid error-prone manual certificate retrieval, which in turn may avoid unnecessary access outages for a cloud service provider-managed domain resulting from an expired domain certificate.

Figure 4:
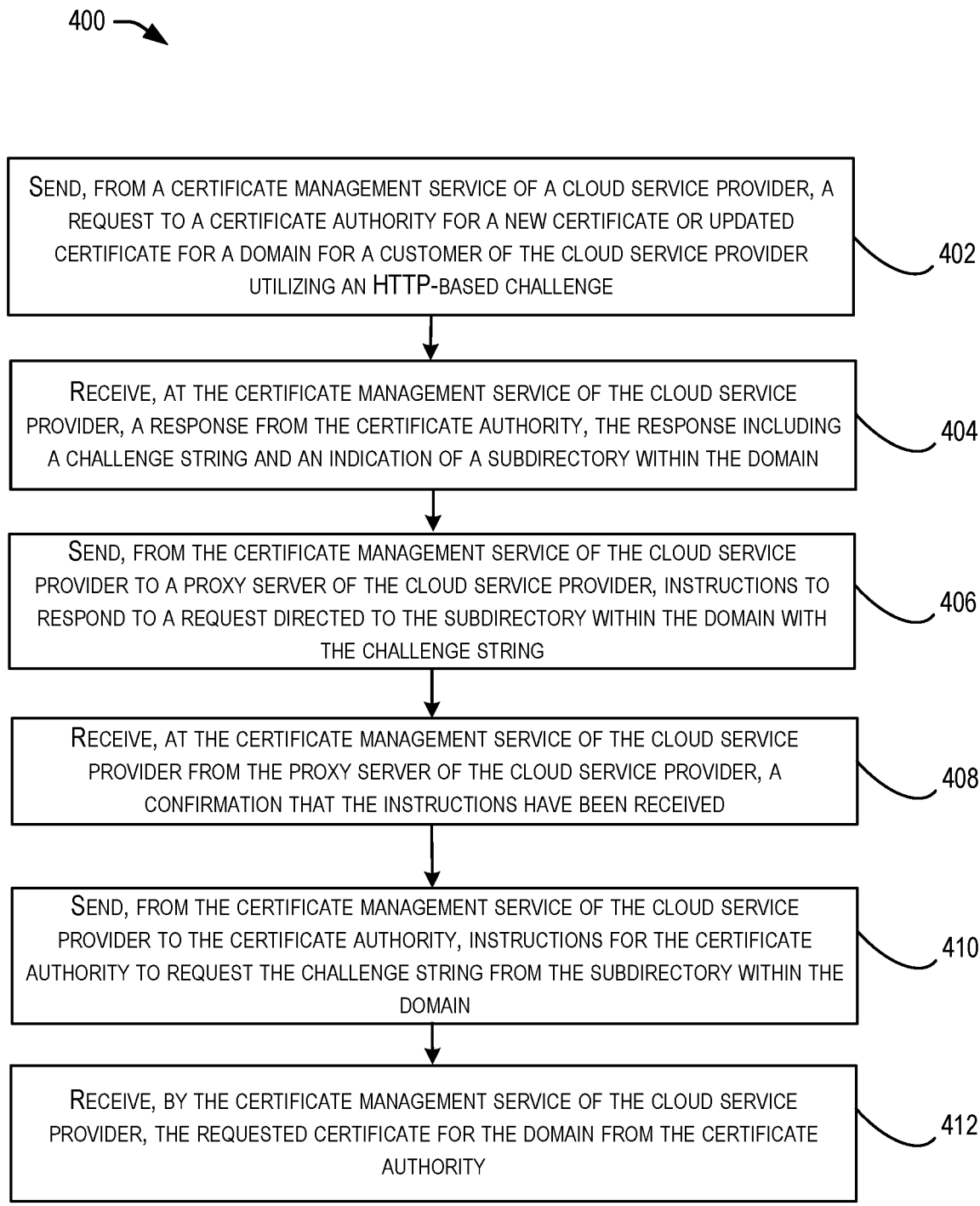
FIG. 4 illustrates an example method for managing the acquisition of a domain certificate by a certificate management service of a cloud service provider, according to at least one embodiment.

FIG. 4 illustrates an example method 400 for managing the acquisition of a domain certificate by a certificate management service of a cloud service provider, according to at least one embodiment. The method 400 may be performed by one or more components of FIGS. 1-2 and 10-11. A computer-readable storage medium comprising computer-readable instructions that, upon execution by one or more processors of a computing device, cause the computing device to perform the method 400. The method 400 may performed in any suitable order. It should be appreciated that the method 400 may include a greater number or a lesser number of steps than that depicted in FIG. 4.

The method 400 may begin at 402, where a request is sent to a certificate authority from a certificate management service of a cloud service provider for a new certificate or updated certificate for a domain for a customer of the cloud service provider utilizing an HTTP-based challenge. Additionally, at 404, a response is received from the certificate authority at the certificate management service of the cloud service provider, the response including a challenge string and an indication of a sub directory within the domain. In various embodiments, the challenge string may include a string of characters with a predetermined length (e.g., 256 characters). For example, the challenge string may be randomly generated by the certificate authority. In another example, the sub directory may be indicated utilizing a uniform resource locator (URL).

Further, at 406, the challenge string and instructions are sent from the certificate management service of the cloud service provider to a proxy server of the cloud service provider to respond to a request directed to the sub directory within the domain with the challenge string.

In addition, at 408, a confirmation that the instructions have been received is received at the certificate management service of the cloud service provider from the proxy server of the cloud service provider. In various embodiments, the confirmation may indicate that the instructions were received by the proxy server and will be implemented by the proxy server.

Furthermore, at 410, instructions are sent from the certificate management service of the cloud service provider to the certificate authority, where the instructions include instructions for the certificate authority to request the challenge string from the subdirectory within the domain. In response to receiving these instructions, the certificate authority may send a request to the sub directory within the domain.

Further still, at 412, the certificate management service of the cloud service provider receives the requested certificate for the domain from the certificate authority. For example, in response to sending the request to the sub directory within the domain, the certificate authority may receive a response including the challenge string from the proxy server of the cloud service provider. In response to receiving and validating the challenge string, the certificate authority may send the requested certificate to the certificate management service.

Figure 5:
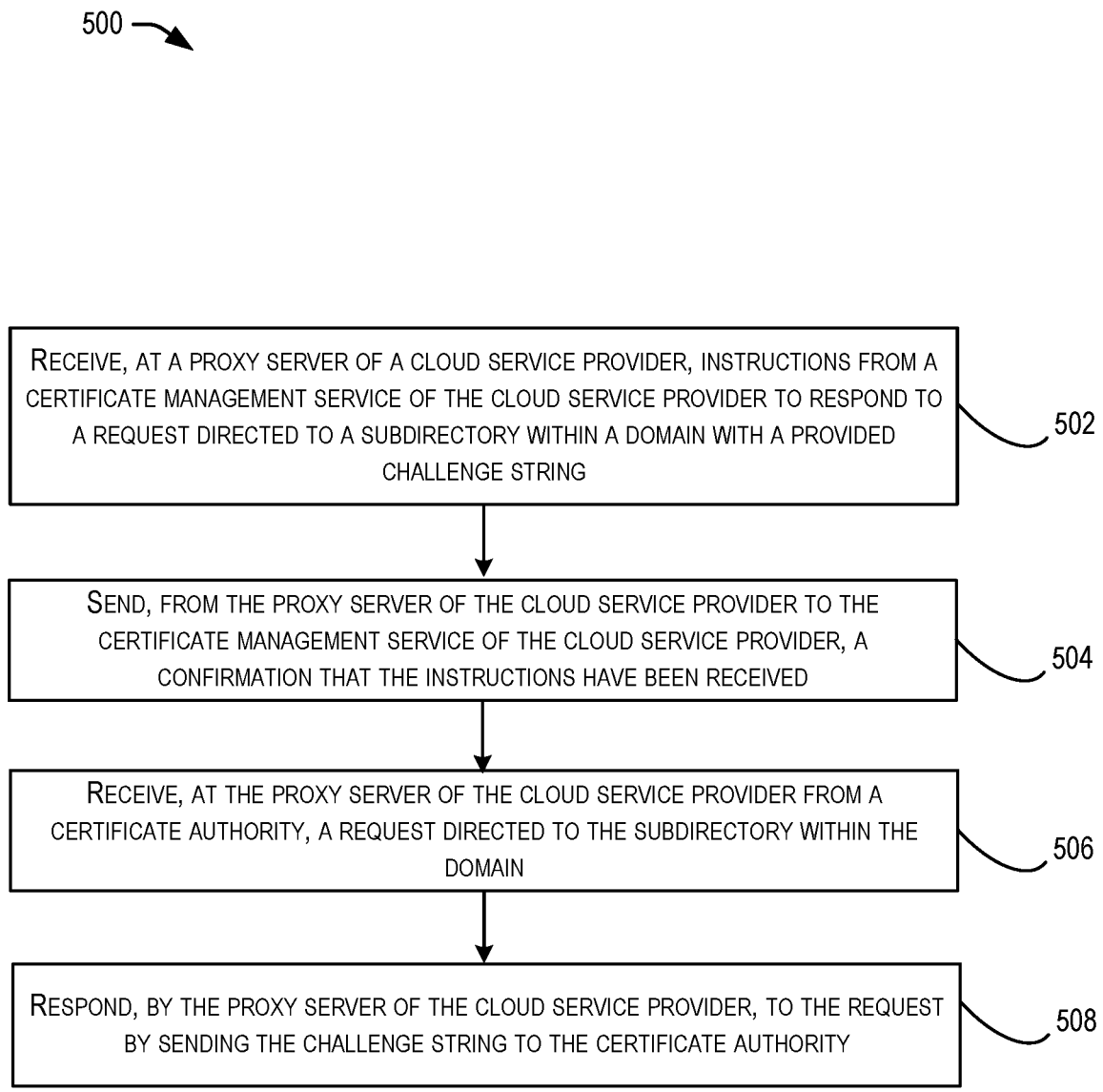
FIG. 5 illustrates an example method for managing the acquisition of a domain certificate by a proxy server of a cloud service provider, according to at least one embodiment.

FIG. 5 illustrates an example method 500 for managing the acquisition of a domain certificate by a proxy server of a cloud service provider, according to at least one embodiment. The method 500 may be performed by one or more components of FIGS. 1-2 and 10-11. A computer-readable storage medium comprising computer-readable instructions that, upon execution by one or more processors of a computing device, cause the computing device to perform the method 500. The method 500 may performed in any suitable order. It should be appreciated that the method 500 may include a greater number or a lesser number of steps than that depicted in FIG. 5.

The method 500 may begin at 502, where a challenge string and instructions are received at a proxy server of a cloud service provider from a certificate management service of the cloud service provider, the instructions including instructions to respond to a request directed to a sub directory within a domain with the provided challenge string. In various embodiments, in response to receiving the instructions, the proxy server may locally store the domain name and the challenge string.

Further, in various embodiments, the proxy server may include a load balancer of the cloud service provider. Further still, in various embodiments, the cloud service provider may host the domain, as well as resources that are identified and accessed utilizing the domain. For example, the cloud service provider may implement one or more nodes that host the domain. In another example, the one or more nodes may receive requests addressed to the domain, and may service those requests (e.g. by providing data in response to the requests).

Also, in one example, the proxy server may manage traffic to these nodes. For instance, the proxy server may receive requests directed to the domain and may route those requests to the one or more nodes that host the domain. In another example, the one or more nodes may receive requests directed to the domain, and may service those requests (e.g., by providing data in response to the requests).

In addition, in various embodiments, one or more on-premises servers separate from the cloud service provider (e.g., that are owned by a customer) may host the domain as well as resources that are identified and accessed utilizing the domain. For example, the proxy server may manage traffic to these on-premises services. The proxy server may receive requests directed to the domain and may route those requests to the on-premises servers hosting the domain.

At 504, the proxy server of the cloud service provider sends a confirmation to the certificate management service of the cloud service provider that the instructions have been received. At 506, a request sent from a certificate authority that is directed to the sub directory within the domain is received at the proxy server of the cloud service provider. In various embodiments, the request may be received at the proxy server for forwarding to a node hosting the domain. Additionally, in various embodiments, the subdirectory within the domain may be identified within a header (such as a layer 7 header) of the request.

Furthermore, at 508, the proxy server of the cloud service provider responds to the request by sending the challenge string to the certificate authority. In various embodiments, the proxy server may send the challenge string to the certificate authority without routing the request to one or more nodes/servers hosting the domain. The challenge string may be received from a certificate management service of the cloud service provider and may be stored at the proxy server (or within a separate data store accessible by the proxy server) and linked to the subdirectory within the domain.

Further still, in various embodiments, the certificate management service of the cloud service provider may receive the requested certificate from the certificate authority. The certificate may be stored at the certificate management service. In various embodiments, the certificate management service may provide the certificate to the one or more nodes/servers hosting the domain. These nodes/servers may provide the certificate to a browser in response to a request from the browser for content from the domain. In another example, the browser may compare the certificate to a list of trusted certificate authorities to confirm that the certificate is valid (and to verify the domain as trusted).

Figure 6:
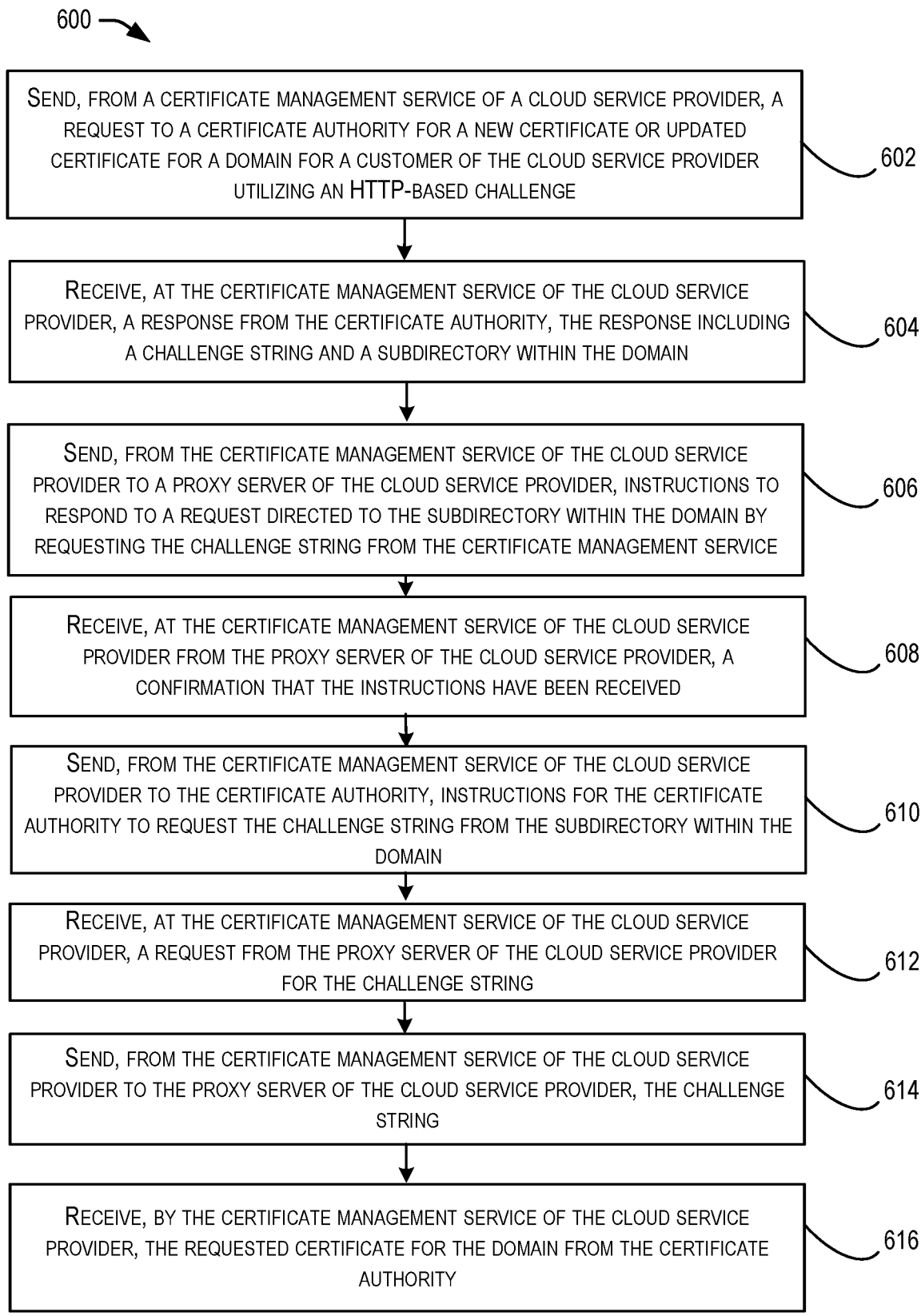
FIG. 6 illustrates another example method for managing the acquisition of a domain certificate by a certificate management service of a cloud service provider, according to at least one embodiment.

FIG. 6 illustrates another example method 600 for managing the acquisition of a domain certificate by a certificate management service of a cloud service provider, according to at least one embodiment. The method 600 may be performed by one or more components of FIGS. 1-2 and 10-11. A computer-readable storage medium comprising computer-readable instructions that, upon execution by one or more processors of a computing device, cause the computing device to perform the method 600. The method 600 may performed in any suitable order. It should be appreciated that the method 600 may include a greater number or a lesser number of steps than that depicted in FIG. 6.

The method 600 may begin at 602, where a request is sent to a certificate authority from a certificate management service of a cloud service provider for a new certificate or updated certificate for a domain for a customer of the cloud service provider utilizing an HTTP-based challenge. Additionally, at 604, a response is received from the certificate authority at the certificate management service of the cloud service provider, the response including a challenge string and an indication of a sub directory within the domain.

Further, at 606, instructions are sent from the certificate management service of the cloud service provider to a proxy server of the cloud service provider to respond to a request directed to the subdirectory within the domain by requesting the challenge string from the certificate management service. Also, in various embodiments, the proxy server may be instructed to respond to the request by requesting the challenge string instead of forwarding the request to a node servicing the domain. The challenge string may be stored at the certificate management service of the cloud service provider (or within a separate data store accessible by the certificate management service) and linked to the sub directory within the domain.

In addition, at 608, a confirmation that the instructions have been received is received at the certificate management service of the cloud service provider from the proxy server of the cloud service provider. Furthermore, at 610, instructions are sent from the certificate management service of the cloud service provider to the certificate authority, where the instructions include instructions for the certificate authority to request the challenge string from the sub directory within the domain. In response to receiving these instructions, the certificate authority may send a request to the sub directory within the domain.

Further still, at 612, the certificate management service of the cloud service provider receives a request from the proxy server of the cloud service provider for the challenge string. Further still, at 614, the certificate management service of the cloud service provider sends the challenge string to the proxy server of the cloud service provider. For example, the certificate management service may retrieve the challenge string from storage (within the certificate management service or elsewhere within the cloud service provider environment) and may send the challenge string to the proxy server.

Also, at 616, the certificate management service of the cloud service provider receives the requested certificate for the domain from the certificate authority. For example, in response to receiving the challenge string, the proxy server may send the challenge string to the certificate authority. The certificate authority may receive a response including the challenge string from the proxy server of the cloud service provider, and in response to receiving and validating the challenge string, the certificate authority may send the requested certificate to the certificate management service.

Figure 7:
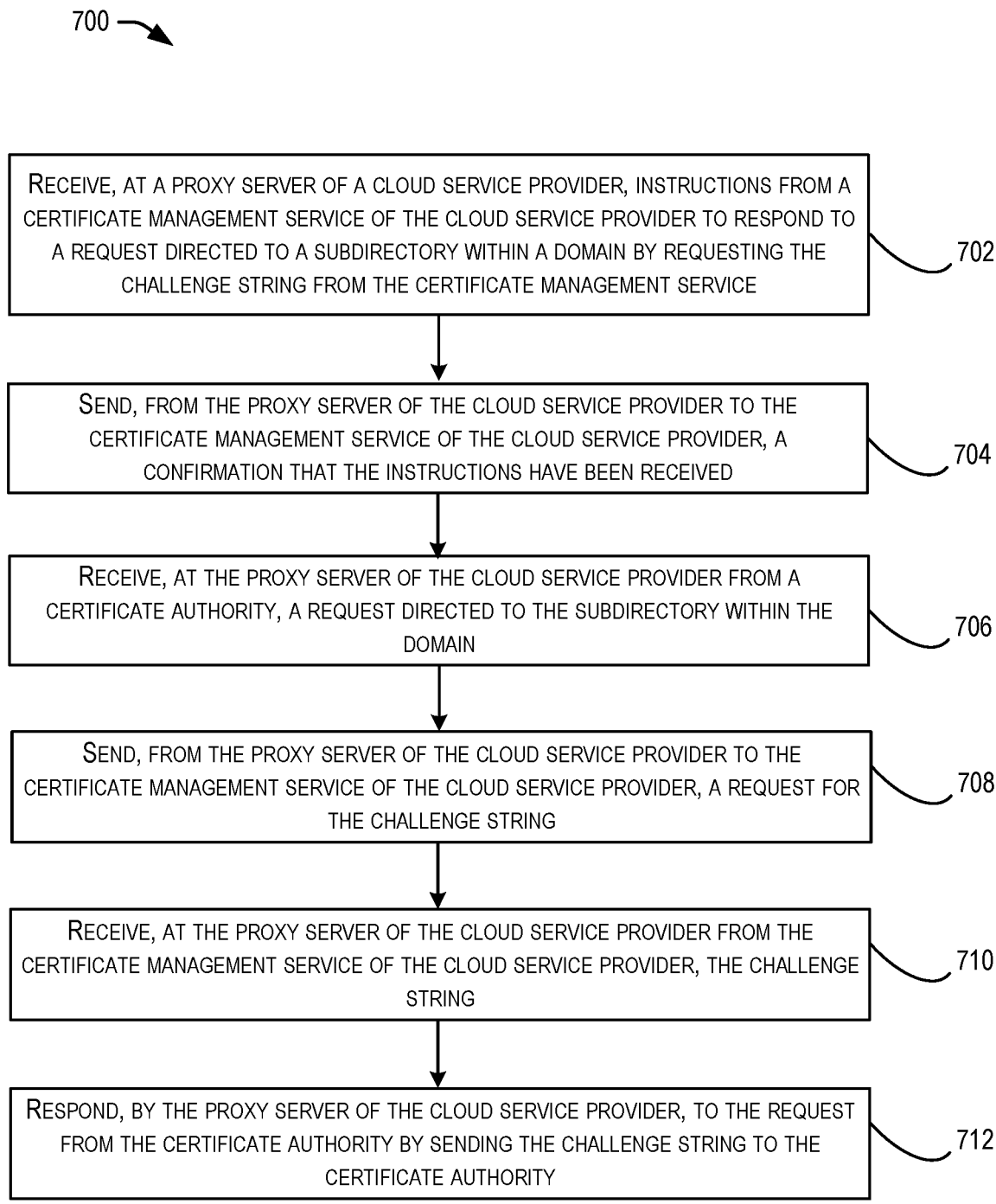
FIG. 7 illustrates another example method for managing the acquisition of a domain certificate by a proxy server of a cloud service provider, according to at least one embodiment.

FIG. 7 illustrates another example method 700 for managing the acquisition of a domain certificate by a proxy server of a cloud service provider, according to at least one embodiment. The method 700 may be performed by one or more components of FIGS. 1-2 and 10-11. A computer-readable storage medium comprising computer-readable instructions that, upon execution by one or more processors of a computing device, cause the computing device to perform the method 700. The method 700 may performed in any suitable order. It should be appreciated that the method 700 may include a greater number or a lesser number of steps than that depicted in FIG. 7.

The method 700 may begin at 702, where instructions are received at a proxy server of a cloud service provider from a certificate management service of the cloud service provider, the instructions including instructions to respond to a request directed to a sub directory within a domain by requesting the challenge string from the certificate management service.

Also, at 704, the proxy server of the cloud service provider sends a confirmation to the certificate management service of the cloud service provider that the instructions have been received. At 706, a request sent from a certificate authority that is directed to the sub directory within the domain is received at the proxy server of the cloud service provider.

Furthermore, at 708, the proxy server of the cloud service provider responds to the request by sending a request for the challenge string to the certificate management service of the cloud service provider. Further still, at 710, the challenge string is received at the proxy server of the cloud service provider from the certificate management service of the cloud service provider. For example, the certificate management service may retrieve the challenge string and may send the challenge string to the proxy server.

Further still, at 712, the proxy server of the cloud service provider responds to the request from the certificate authority by sending the challenge string to the certificate authority. In various embodiments, the proxy server may send the challenge string to the certificate authority without routing the request to one or more nodes/servers hosting the domain.

Also, in various embodiments, the certificate management service of the cloud service provider may receive the requested certificate from the certificate authority. The certificate may be stored at the certificate management service. In various embodiments, the certificate management service may provide the certificate to the one or more nodes/servers hosting the domain. These nodes/servers may provide the certificate to a browser in response to a request from the browser for content from the domain. In another example, the browser may compare the certificate to a list of trusted certificate authorities to confirm that the certificate is valid (and to verify the domain as trusted).

Figure 8:
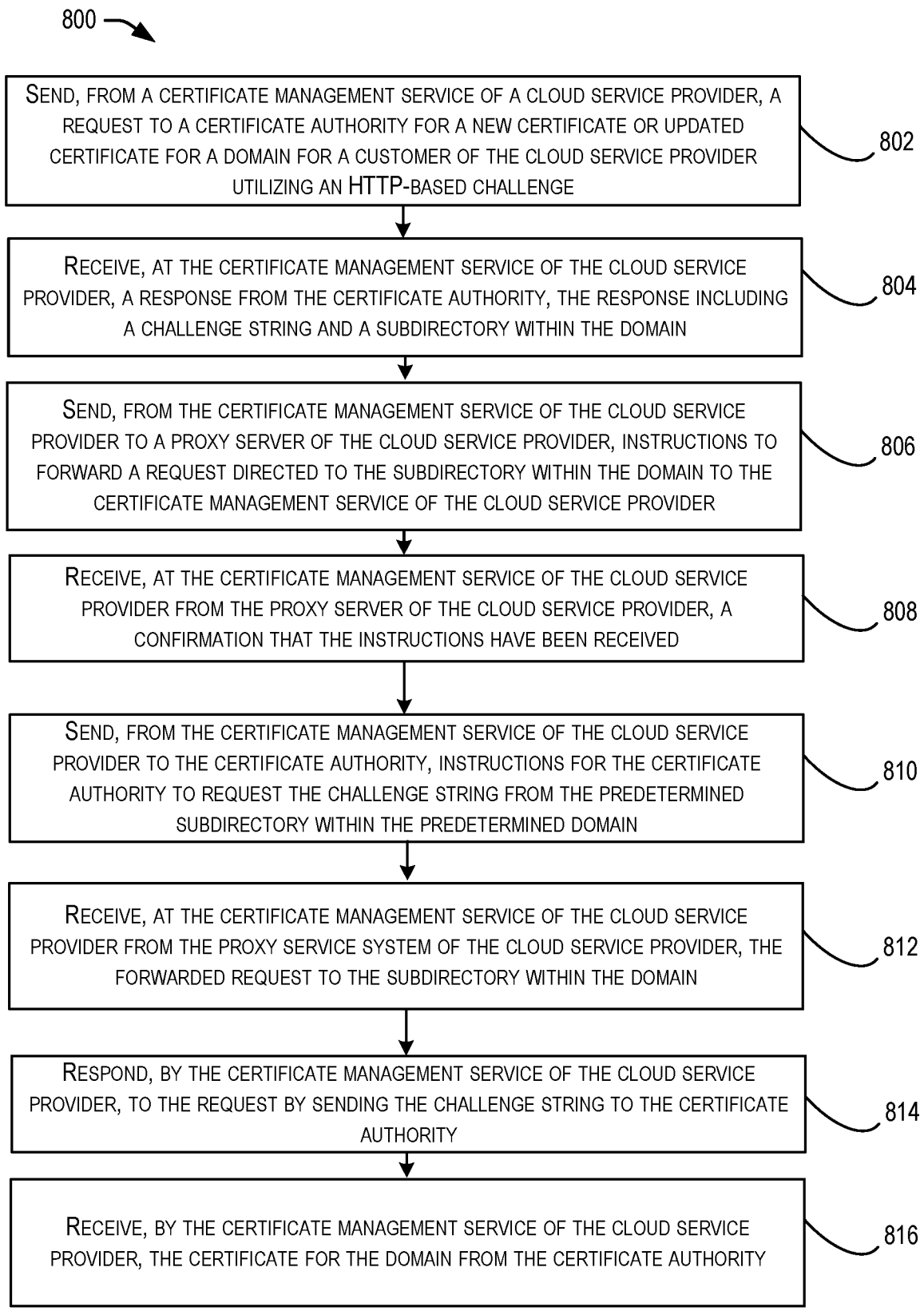
FIG. 8 illustrates another example method for managing the acquisition of a domain certificate by a certificate management service of a cloud service provider, according to at least one embodiment.

FIG. 8 illustrates another example method 800 for managing the acquisition of a domain certificate by a certificate management service of a cloud service provider, according to at least one embodiment. The method 800 may be performed by one or more components of FIGS. 1-2 and 10-11. A computer-readable storage medium comprising computer-readable instructions that, upon execution by one or more processors of a computing device, cause the computing device to perform the method 800. The method 800 may performed in any suitable order. It should be appreciated that the method 800 may include a greater number or a lesser number of steps than that depicted in FIG. 8.

The method 800 may begin at 802, where a request is sent to a certificate authority from a certificate management service of a cloud service provider for a new certificate or updated certificate for a domain for a customer of the cloud service provider utilizing an HTTP-based challenge. At 804, a response is received from the certificate authority at the certificate management service of the cloud service provider, the response including a challenge string and a sub directory within the domain. The challenge string may be stored at the certificate management service of the cloud service provider (or within a separate data store accessible by the certificate management service) and linked to the sub directory within the domain.

Additionally, at 806, instructions are sent from the certificate management service of the cloud service provider to a proxy server of the cloud service provider to forward a request directed to the subdirectory within the domain to the certificate management service of the cloud service provider. For example, the proxy server may be instructed to forward the request to the certificate management service instead of forwarding the request to a node servicing the domain.

Further, at 808, a confirmation is received at the certificate management service of the cloud service provider from the proxy server of the cloud service provider, the confirmation indicating that the instructions have been received by the proxy server.

Further still, at 810, instructions are sent from the certificate management service of the cloud service provider to the certificate authority to request the challenge string from the subdirectory within the domain. At 812, the certificate management service of the cloud service provider receives from the proxy server of the cloud service provider the forwarded request to the sub directory within the domain.

Also, at 814, the certificate authority of the cloud service provider responds to the request by sending the challenge string to the certificate authority. At 816, the certificate management service of the cloud service provider receives the certificate from the certificate authority.

Figure 9:
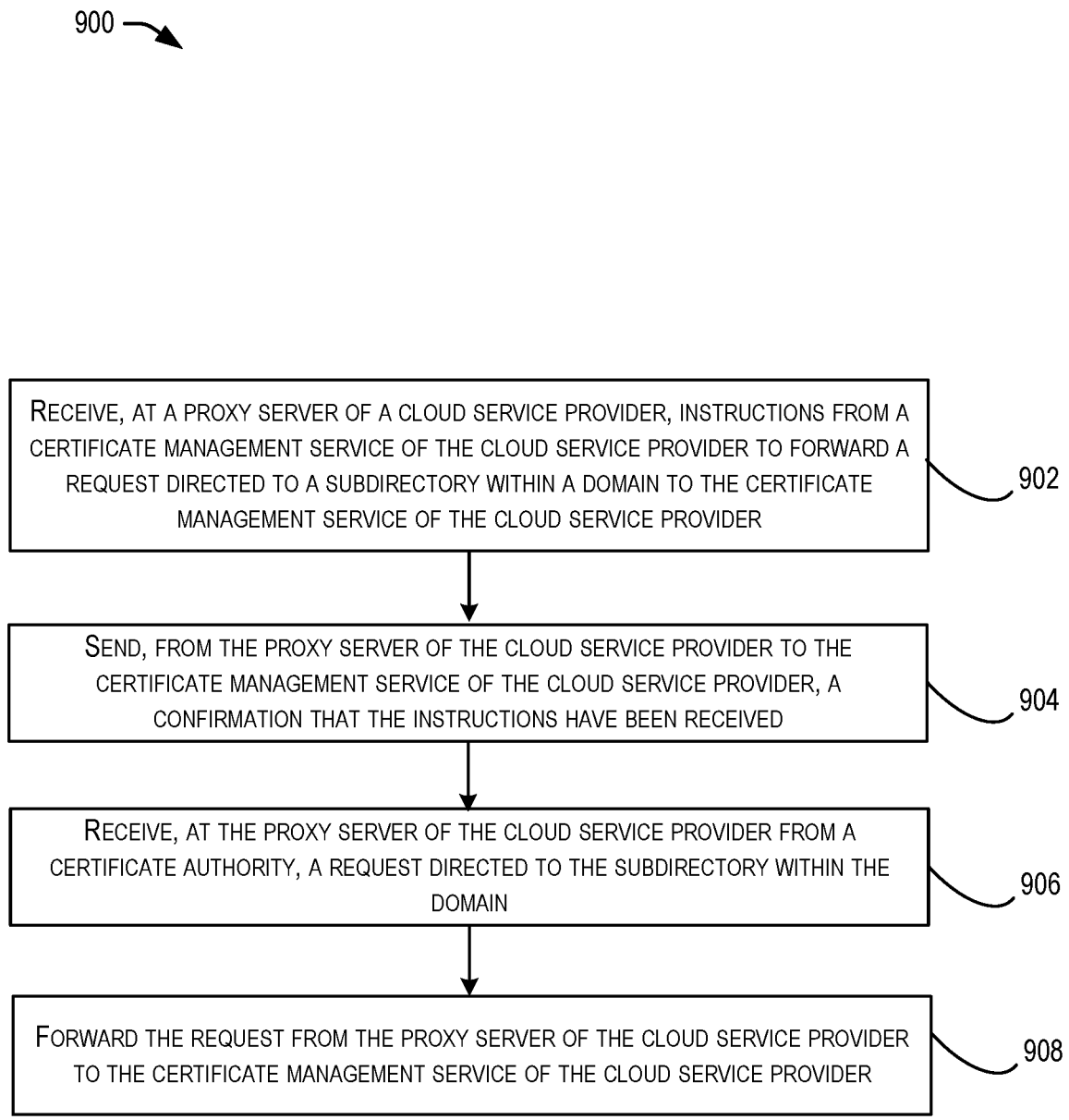
FIG. 9 illustrates another example method for managing the acquisition of a domain certificate by a proxy server of a cloud service provider, according to at least one embodiment.

FIG. 9 illustrates another example method 900 for managing the acquisition of a domain certificate by a proxy server of a cloud service provider, according to at least one embodiment. The method 900 may be performed by one or more components of FIGS. 1-2 and 10-11. A computer-readable storage medium comprising computer-readable instructions that, upon execution by one or more processors of a computing device, cause the computing device to perform the method 900. The method 900 may performed in any suitable order. It should be appreciated that the method 900 may include a greater number or a lesser number of steps than that depicted in FIG. 9.

The method 900 may begin at 902, where instructions are received at a proxy server of a cloud service provider from a certificate management service of the cloud service provider, the instructions including instructions to forward a request directed to the subdirectory within a domain to the certificate management service of the cloud service provider.

Also, at 904, the proxy server of the cloud service provider sends a confirmation to the certificate management service of the cloud service provider that the instructions have been received. At 906, a request sent from a certificate authority that is directed to the sub directory within the domain is received at the proxy server of the cloud service provider.

Furthermore, at 908, the proxy server of the cloud service provider responds to the request by forwarding the request to the certificate management service of the cloud service provider. In various embodiments, in response to receiving the request, the certificate management service may retrieve a challenge string and send the challenge string to the certificate authority.

Figure 10:
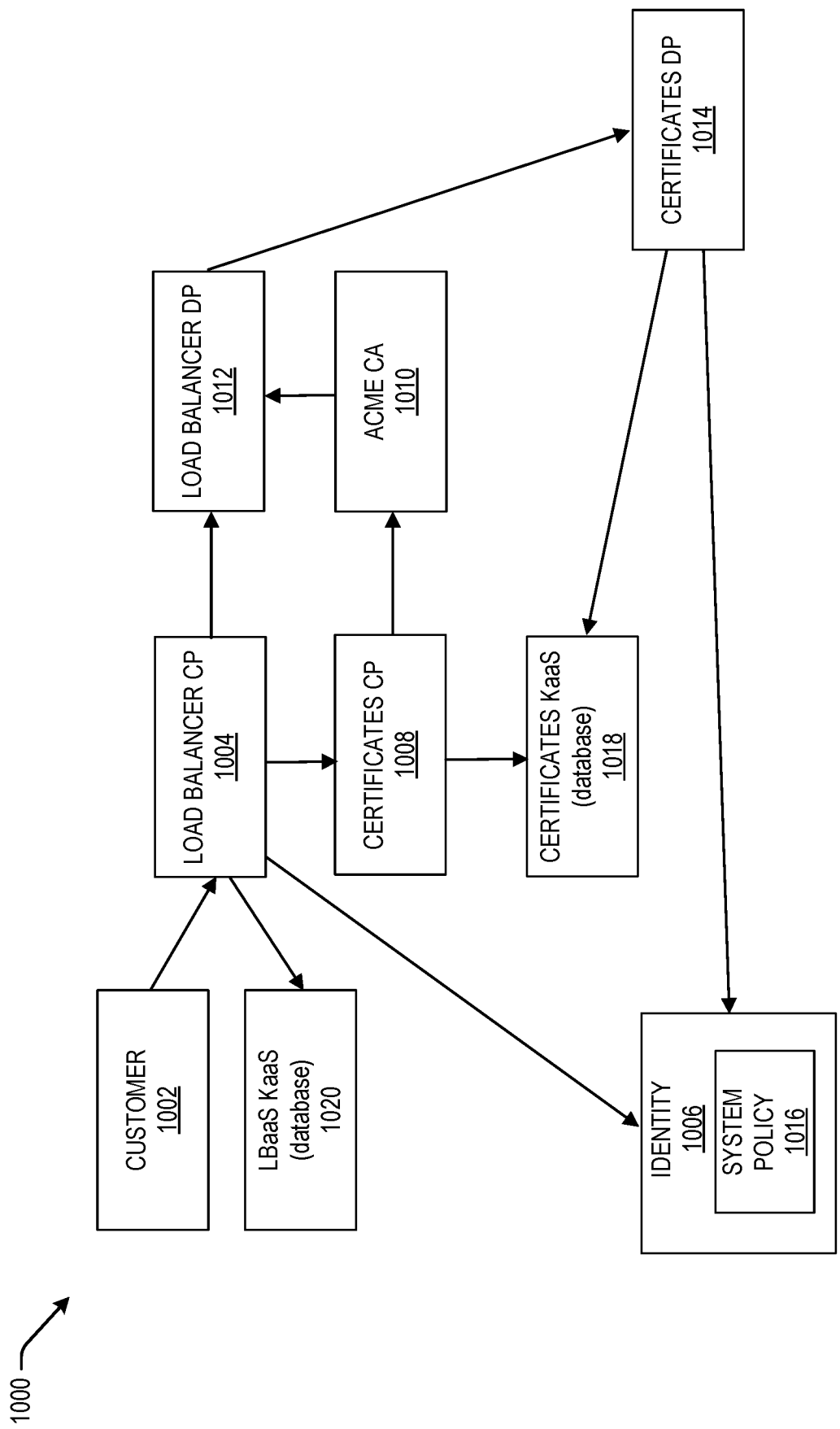
FIG. 10 illustrates an exemplary environment for obtaining a public certificate utilizing a load balancer, according to at least one embodiment.

FIG. 10 illustrates an exemplary environment for obtaining a public certificate utilizing a load balancer, according to one embodiment. In various embodiments, a customer 1002 points a domain name service (DNS) record for their domain to a reserved IP. Additionally, in various embodiments, the customer 1002 may send a call to a load balancer control plane (CP) 1004 requesting a load balancer with a public certificate for a particular domain using the reserved IP.

Further, in various embodiments, the load balancer CP 1004 may call an identity system 1006 to retrieve an OBO token for the customer 1002. The load balancer CP 1004 API may store a work message for the request in the LBaaS database 1020, and the load balancer CP 1004 may pull the work message from the LBaaS database 1020.

Further still, in various embodiments, the load balancer CP 1004 may call the certificates CP 1008 to provision the public certificate for the load balancer using OBO. The certificates CP may call an ACME certificate authority (CA) 1010 to order the certificate using an HTTP challenge method, and the challenge question and answer are returned. The certificates control plane (CP) 1008 calls to the certificates database 1018 to store the ACME challenge, and the load balancer CP 1004 calls the load balancer data plane (DP) 1012 to provision the load balancer.

Also, in various embodiments, the load balancer DP 1012 may call the certificates DP 1014 metadata API to retrieve the ACME CA 1010 challenge question and answer. The load balancer DP 1013 may stand up the customer's load balancer with a routing rule to respond to the ACME CA 1010 challenge. The load balancer CP 1004 may call the certificates CP 1008 to process the certificate order with the ACME CA 1010.

In addition, in various embodiments, the certificates CP 1008 may call to the ACME CA 1010 to process the certificate order. The ACME CA 1010 may call via http to ask the challenge question against the requested domain, and the request may be routed to the customer load balancer, where the load balancer detects the challenge question and responds with the expected answer.

Furthermore, in various embodiments, the certificates CP 1008 may securely store the signed certificate and may store an association object between the load balancer ID and the certificate ID. The certificates DP 1014 may replicate the certificate, and the certificates CP 1008 may transition the certificate to an ACTIVE state. The load balancer CP 1004 may poll the certificate and determine that it has been transitioned to the ACTIVE state.

Further still, in various embodiments, the load balancer CP 1004 may call the load balancer DP 1012 to finish provisioning the load balancer. The load balancer DP 1012 may call the certificates DP 1008 to retrieve the certificate using a resource principal. The certificates DP 1014 may call the identity system 1006 to authorize the call, where the call may include metadata about the associations. The identity system 1006 may authorize the request based on a system policy 1016 (where the load balancer reads the certificate it is associated with). The load balancer DP 1012 may then receive the certificate and private key, and may finish provisioning the customer 1002.

Figure 11:
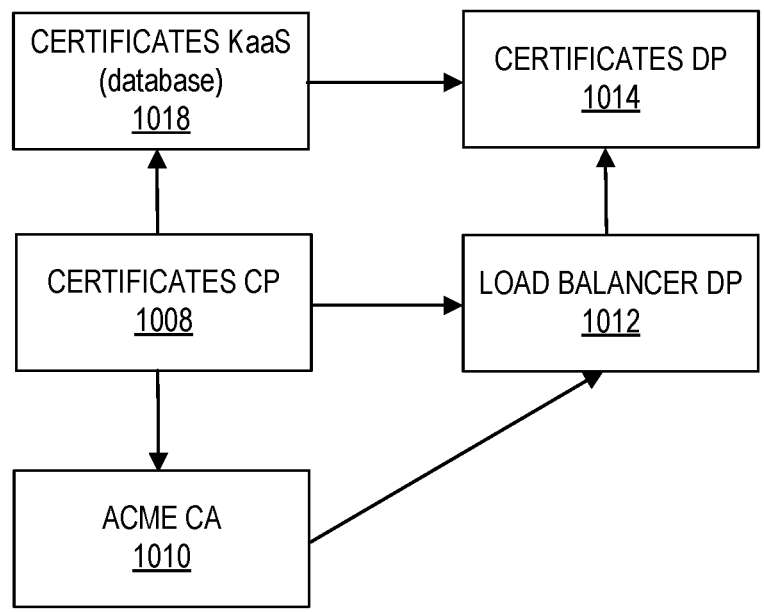
FIG. 11 illustrates an exemplary environment for renewing a public certificate utilizing a load balancer, according to at least one embodiment.

FIG. 11 illustrates an exemplary environment for renewing a public certificate utilizing a load balancer, according to one embodiment. In various embodiments, a certificates CP 1008 may read a public certificate expiry time from the certificates KaaS database 1018 and detects that it is time to renew the certificate. The certificates CP may call the ACME CA 1010 to order a new certificate using an HTTP challenge method, and a challenge question and answer is returned by the ACME CA 1010.

Additionally, in various embodiments, the certificates CP 1008 may store the challenge question and answer in the certificates KaaS database 1018. The certificates DP 1014 may replicate the certificate challenge question and answer, making it available via the metadata API. The load balancer DP 1012 may poll the certificates DP 1014 metadata API for the new challenge. The load balancer DP 1012 may set a routing rule to answer the ACME HTTP challenge for the load balancer.

Further, in various embodiments, the certificates CP 1008 may poll for the challenge question via HTTP and detects that the routing rule has been set. The certificates CP 1008 may call the ACME CA 1010 to proceed with the order. The ACME CA may call via http to ask the challenge question against the requested domain, and the request may be routed to the customer load balancer, where the load balancer detects the challenge question and responds with the expected answer.

Further still, in various embodiments, the certificates CP 1008 may securely store the signed certificate as a new version of the existing certificate object. The certificates DP 1014 may replicate the new version of the certificate. The load balancer DP 1012 may poll the certificates DP 1014 metadata API to detect the availability of the new certificate version. The load balancer DP 1012 may call the certificates DP 1008 to read the new certificate version and bind it to the load balancer.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
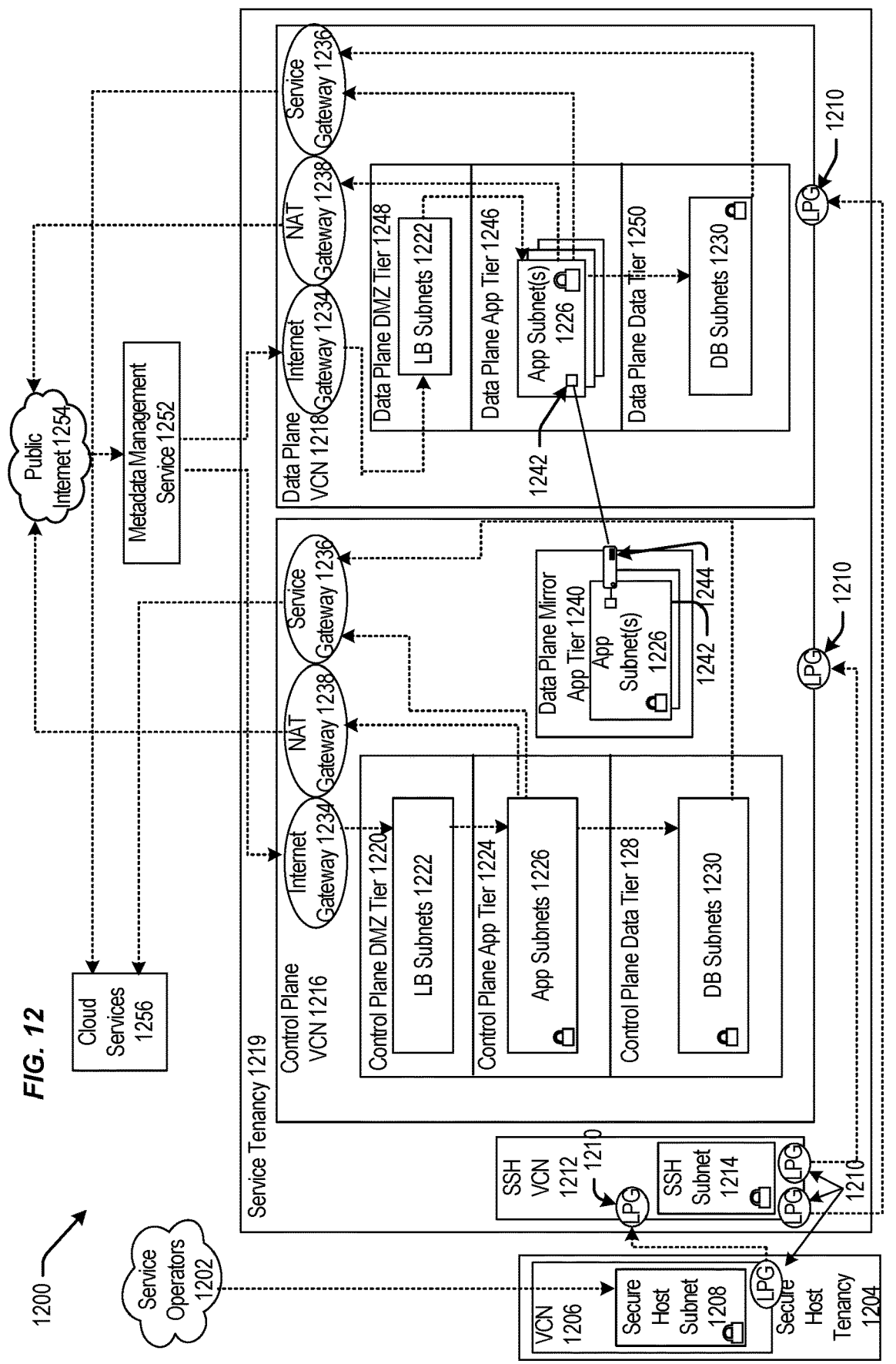
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Metadata that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
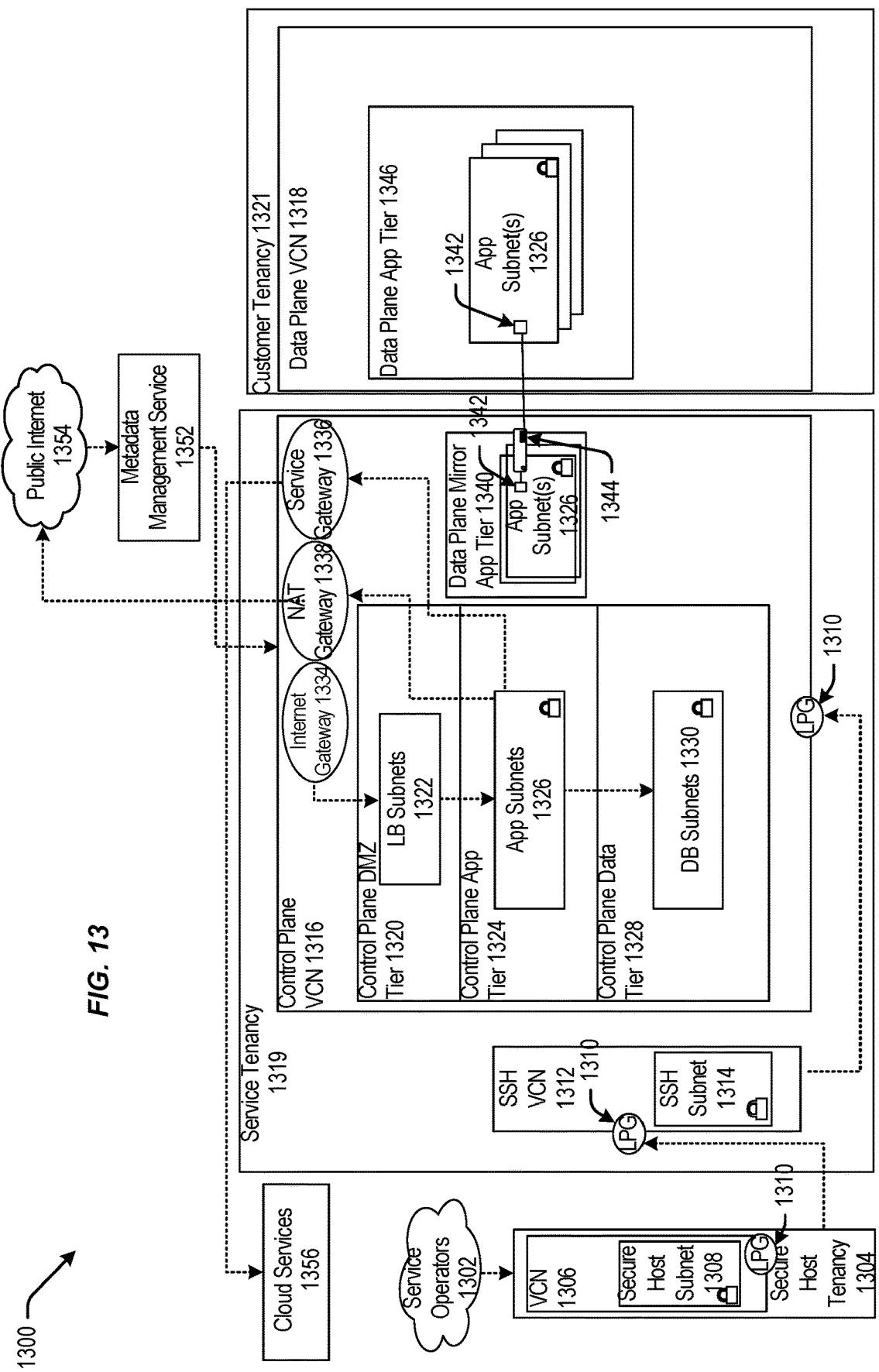
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1306 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1210 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g., the control plane DMZ tier 1220 of FIG. 12) that can include LB subnet(s) 1322 (e.g., LB subnet(s) 1222 of FIG. 12), a control plane app tier 1324 (e.g., the control plane app tier 1224 of FIG. 12) that can include app subnet(s) 1326 (e.g., app subnet(s) 1226 of FIG. 12), a control plane data tier 1328 (e.g., the control plane data tier 1228 of FIG. 12) that can include database (DB) subnet(s) 1330 (e.g., similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g., the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g., the service gateway 1236 of FIG. 12) and a network address translation (NAT) gateway 1338 (e.g., the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
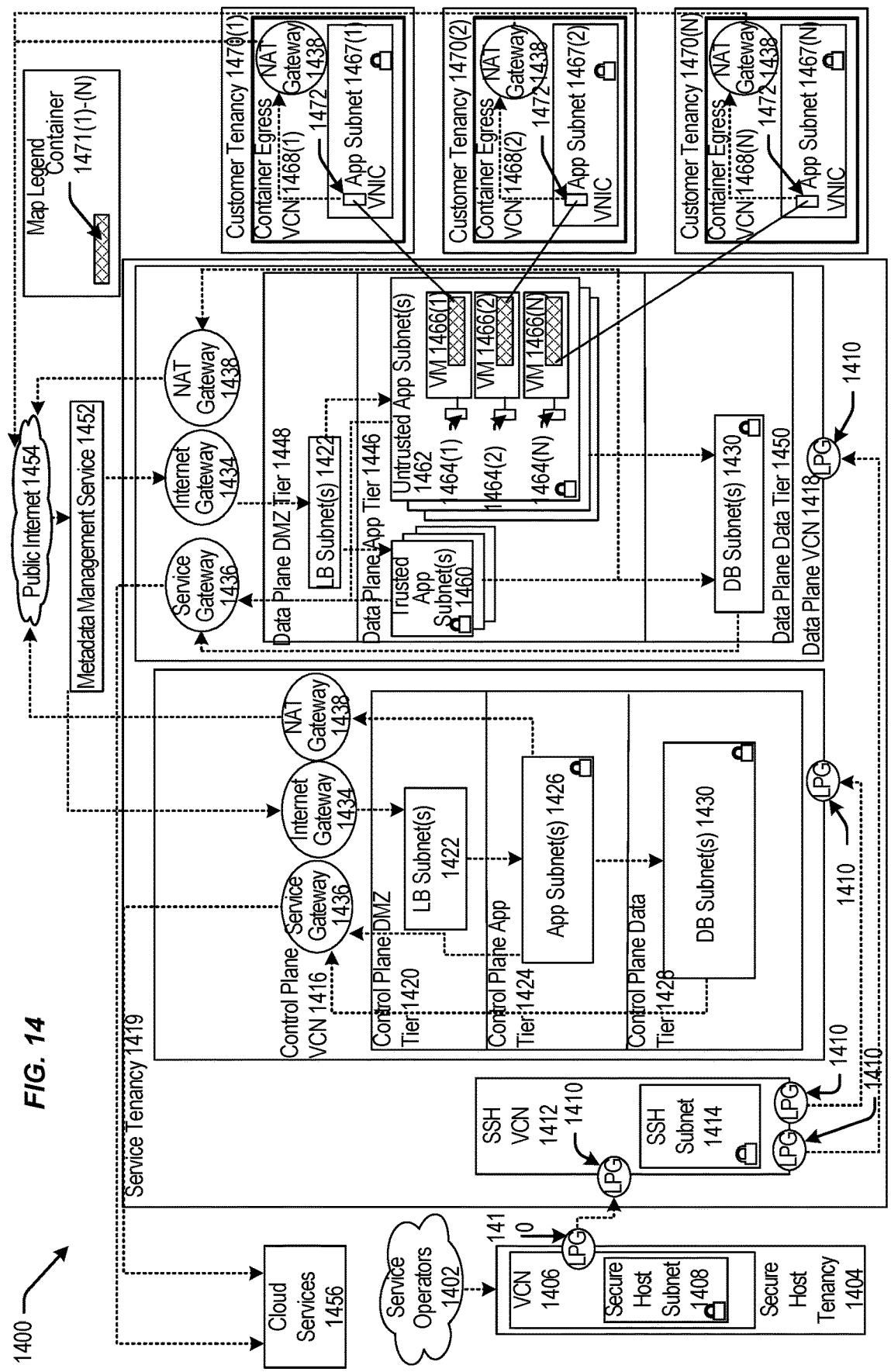
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1206 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g., the control plane VCN 1216 of FIG. 12) via an LPG 1410 contained in the control plane VCN 1416 and to a data plane VCN 1418 (e.g., the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g., the control plane DMZ tier 1220 of FIG. 12) that can include load balancer (LB) subnet(s) 1422 (e.g., LB subnet(s) 1222 of FIG. 12), a control plane app tier 1424 (e.g., the control plane app tier 1224 of FIG. 12) that can include app subnet(s) 1426 (e.g., similar to app subnet(s) 1226 of FIG. 12), a control plane data tier 1428 (e.g., the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 12) and a network address translation (NAT) gateway 1438 (e.g., the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier 1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12).

The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
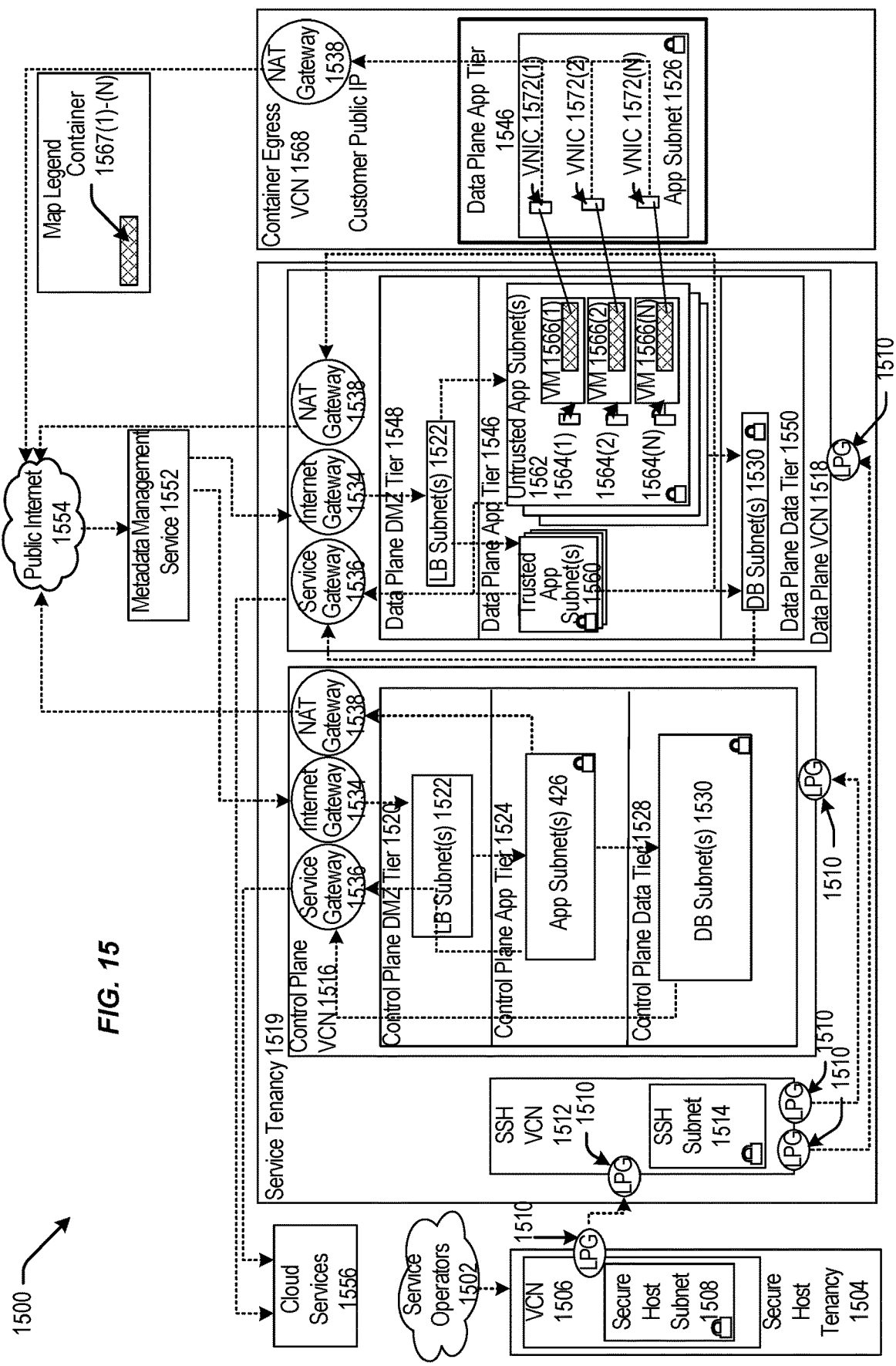
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g., the control plane VCN 1216 of FIG. 12) via an LPG 1510 contained in the control plane VCN 1516 and to a data plane VCN 1518 (e.g., the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g., the control plane DMZ tier 1220 of FIG. 12) that can include LB subnet(s) 1522 (e.g., LB subnet(s) 1222 of FIG. 12), a control plane app tier 1524 (e.g., the control plane app tier 1224 of FIG. 12) that can include app subnet(s) 1526 (e.g., app subnet(s) 1226 of FIG. 12), a control plane data tier 1528 (e.g., the control plane data tier 1228 of FIG. 12) that can include DB subnet(s)

1530 (e.g., DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 12) and a network address translation (NAT) gateway 1538 (e.g., the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g., untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet 1254 of FIG. 12).

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
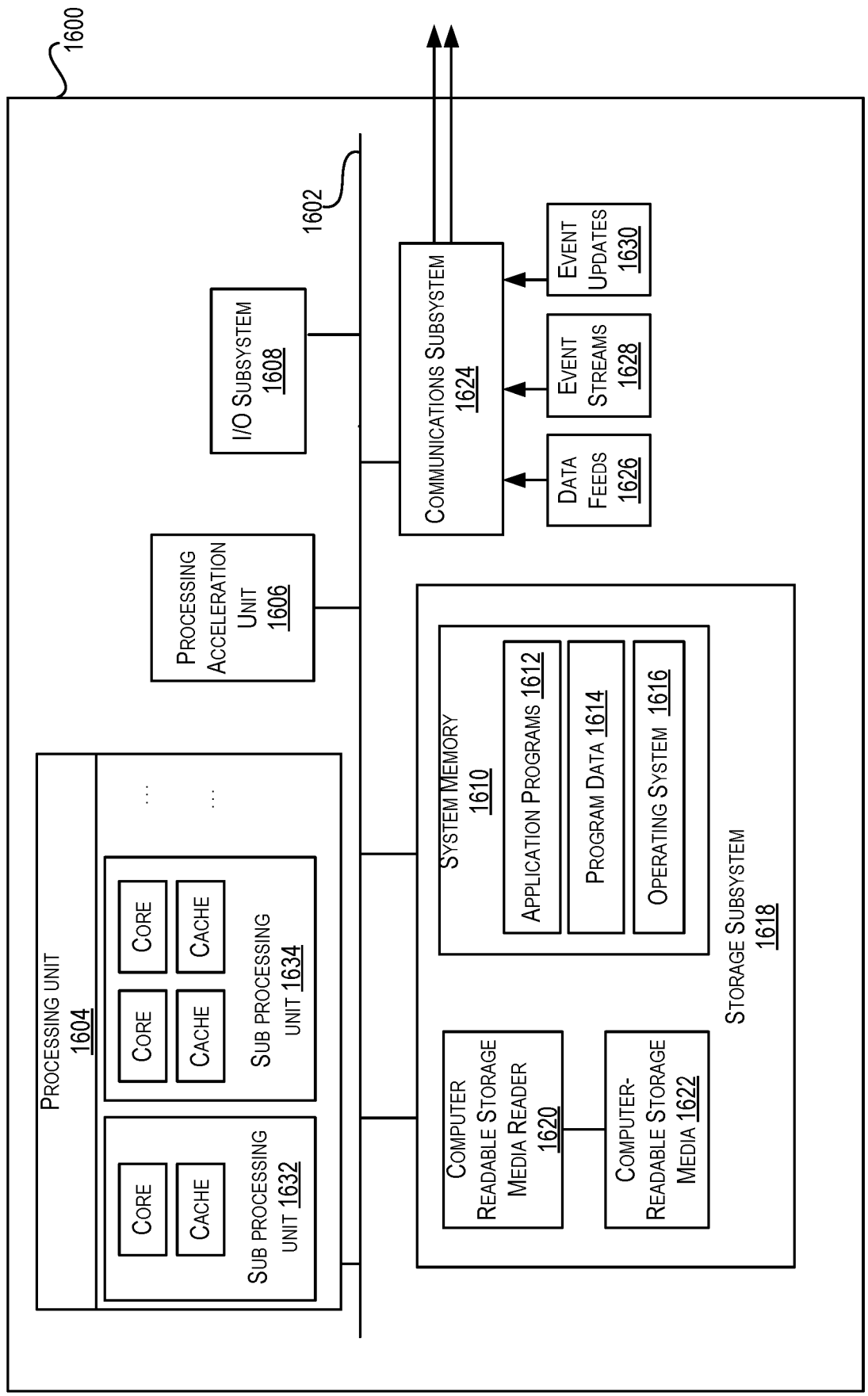
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, web cams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1604 provide the functionality described above. Storage subsystem 1618 may also provide a repository for storing data used in accordance with the present disclosure.

As depicted in the example in FIG. 16, storage subsystem 1618 can include various components including a system memory 1610, computer-readable storage media 1622, and a computer readable storage media reader 1620. System memory 1610 may store program instructions that are loadable and executable by processing unit 1604. System memory 1610 may also store data that is used during the execution of the instructions and/or data that is generated during the execution of the program instructions. Various different kinds of programs may be loaded into system memory 1610 including but not limited to client applications, Web browsers, mid-tier applications, relational database management systems (RDBMS), virtual machines, containers, etc.

System memory 1610 may also store an operating system 1616. Examples of operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1600 executes one or more virtual machines, the virtual machines along with their guest operating systems (GOSs) may be loaded into system memory 1610 and executed by one or more processors or cores of processing unit 1604.

System memory 1610 can come in different configurations depending upon the type of computer system 1600. For example, system memory 1610 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1610 may include a basic input/output system (BIOS) containing basic routines that help to transfer information between elements within computer system 1600, such as during start-up.

Computer-readable storage media 1622 may represent remote, local, fixed, and/or removable storage devices plus storage media for temporarily and/or more permanently containing, storing, computer-readable information for use by computer system 1600 including instructions executable by processing unit 1604 of computer system 1600.

Computer-readable storage media 1622 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Machine-readable instructions executable by one or more processors or cores of processing unit 1604 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    sending, by a certificate management service implemented within a cloud service provider infrastructure, a request to a certificate authority for a certificate;
    storing, by a computer system at a proxy server implemented within the cloud service provider infrastructure that manages a flow of data to a plurality of hosts, a challenge string obtained from the certificate management service;
    intercepting, by the computer system at the proxy server, a request from the certificate authority directed to a first domain hosted by one of the plurality of hosts, wherein the request is generated in response to a challenge to confirm control over the first domain;
    determining, by the computer system at the proxy server, a response to the request; and
    sending, by the computer system at the proxy server, the response to the certificate authority, wherein the response includes challenge data obtained from the certificate authority.

2. The computer-implemented method of claim 1, wherein:
    the plurality of hosts are implemented within the cloud service provider infrastructure; and
    the first domain is associated with a customer of the cloud service provider infrastructure.

3. The computer-implemented method of claim 1, wherein:
    the plurality of hosts are implemented within a customer on-site hosting infrastructure separate from the cloud service provider infrastructure.

4. The computer-implemented method of claim 1, wherein determining the response to the request comprises:
    sending, by the computer system at the proxy server, a request for the challenge string to the certificate management service;
    receiving, by the computer system at the proxy server, the challenge string from the certificate management service; and
    including, by the computer system at the proxy server, the challenge string in the response sent to the certificate authority.

5. The computer-implemented method of claim 1, comprising receiving, by the computer system at the proxy server:
    the challenge string, and instructions to store the challenge string locally within the proxy server, and to automatically respond to a request directed to a subdirectory of the first domain with the challenge string instead of routing the request to one of the plurality of hosts that hosts the first domain;
wherein the request from the certificate authority is directed to the subdirectory of the first domain.

6. The computer-implemented method of claim 1, wherein determining
the response to the request comprises:
retrieving, by the computer system at the proxy server, the challenge string that is stored locally at the proxy server; and
including, by the computer system at the proxy server, the challenge string in the response sent to the certificate authority.

7. The computer-implemented method of claim 1, comprising:
receiving, by the computer system at the proxy server, a second request from the certificate authority identifying a second domain hosted by one of the plurality of hosts;
determining, by the computer system at the proxy server, a response to the second request; and
sending, by the computer system at the proxy server, the response to the second request to the certificate authority;
wherein the first domain is associated with a first customer of a cloud service provider infrastructure, and the second domain is associated with a second customer of the cloud service provider infrastructure.

8. The computer-implemented method of claim 1, wherein the response includes the challenge string.

9. The computer-implemented method of claim 1, wherein determining the response to the request comprises:
retrieving, by the computer system at the proxy server, the challenge string that is stored at a storage location within the cloud service provider infrastructure that is accessible to the proxy server; and
including, by the computer system at the proxy server, the challenge string in the response sent to the certificate authority.

10. The computer-implemented method of claim 1, wherein the request is directed to a subdirectory of the first domain.

11. A system comprising:
one or more processors configured to:
send, by a certificate management service implemented within a cloud service provider infrastructure, a request to a certificate authority for a certificate;
store, at a proxy server implemented within the cloud service provider infrastructure that manages a flow of data to a plurality of hosts, a challenge string obtained from the certificate management service;
intercepting, by the proxy server, a request from the certificate authority directed to a first domain hosted by one of the plurality of hosts, wherein the request is generated in response to a challenge to confirm control over the first domain;
determine, by the proxy server, a response to the request; and
send, by the proxy server, the response to the certificate authority, wherein the response includes challenge data obtained from the certificate authority.

12. The system of claim 11, wherein:
the plurality of hosts are implemented within a cloud service provider infrastructure; and
the first domain is associated with a customer of the cloud service provider infrastructure.

13. The system of claim 11, wherein:
the plurality of hosts are implemented within a customer on-site hosting infrastructure separate from the cloud service provider infrastructure.

14. The system of claim 11, wherein determining the response to the request comprises:
sending, at the proxy server, a request for the challenge string to the certificate management service;
receiving, at the proxy server, the challenge string from the certificate management service; and
including, at the proxy server, the challenge string in the response sent to the certificate authority.

15. The system of claim 11, wherein the one or more processors are further configured to receive, at the proxy server:
the challenge string, and
instructions to store the challenge string locally within the proxy server, and to automatically respond to a request directed to a subdirectory of the first domain with the challenge string instead of routing the request to one of the plurality of hosts that hosts the first domain;
wherein the request from the certificate authority is directed to the subdirectory of the first domain.

16. The system of claim 11, wherein determining the response to the request comprises:
retrieving, at the proxy server, the challenge string that is stored locally at the proxy server; and
including, at the proxy server, the challenge string in the response sent to the certificate authority.

17. The system of claim 11, wherein the one or more processors are further configured to:
receive, at the proxy server, a second request from the certificate authority identifying a second domain hosted by one of the plurality of hosts;
determine, by the proxy server, a response to the second request; and
send, by the proxy server, the response to the second request to the certificate authority;
wherein the first domain is associated with a first customer of a cloud service provider infrastructure, and the second domain is associated with a second customer of the cloud service provider infrastructure.

18. The system of claim 11, wherein the response includes the challenge string.

19. The system of claim 11, wherein determining the response to the request comprises:
retrieving, at the proxy server, the challenge string that is stored at a storage location within the cloud service provider infrastructure that is accessible to the proxy server; and
including, at the proxy server, the challenge string in the response sent to the certificate authority.

20. A non-transitory computer-readable medium storing a set of instructions, the set of instructions when executed by one or more processors cause processing to be performed comprising:
sending, by a certificate management service implemented within a cloud service provider infrastructure, a request to a certificate authority for a certificate;
storing, by a computer system at a proxy server implemented within the cloud service provider infrastructure that manages a flow of data to a plurality of hosts, a challenge string obtained from the certificate management service;

intercepting, by the computer system at the proxy server, a request from the certificate authority directed to a first domain hosted by one of the plurality of hosts, wherein the request is generated in response to a challenge to confirm control over the first domain;

determining, by the computer system at the proxy server, a response to the request; and sending, by the computer system at the proxy server, the response to the certificate authority, wherein the response includes challenge data obtained from the certificate authority.

\* \* \* \* \*